(12) United States Patent
Shahar et al.

(10) Patent No.: US 6,987,754 B2
(45) Date of Patent: Jan. 17, 2006

(54) ADAPTIVE DOWNSTREAM MODULATION SCHEME FOR BROADBAND WIRELESS ACCESS SYSTEMS

(76) Inventors: Menashe Shahar, 16 Kirati, Ramat-Gan (IL); Raul Asia, 8 Dan Pegis, Apt 2, Jerusalem (IL); Amnon Jonas, 7A Byalik, Jerusalem (IL); Yonatan Manor, 16 Einstein St., 34604 Haifa (IL)

( * ) Notice: Subject to any disclaimer, the term of this patent is extended or adjusted under 35 U.S.C. 154(b) by 800 days.

(21) Appl. No.: 09/801,149

(22) Filed: Mar. 7, 2001

(65) Prior Publication Data

US 2003/0002495 A1 Jan. 2, 2003

Related U.S. Application Data

(60) Provisional application No. 60/187,567, filed on Mar. 7, 2000.

(51) Int. Cl.
*H04B 7/212* (2006.01)

(52) U.S. Cl. .................................. 370/349; 370/329
(58) Field of Classification Search ................ 370/204, 370/205, 347, 332, 337, 212, 310.1, 333, 370/329, 341, 349; 375/340, 300, 315, 241, 375/242
See application file for complete search history.

(56) References Cited

U.S. PATENT DOCUMENTS

| | | |
|---|---|---|
| 4,010,465 A | 3/1977 | Dodington et al. |
| 4,099,121 A | 7/1978 | Fang |
| 4,385,384 A | 5/1983 | Rosbury et al. |
| 5,052,024 A | 9/1991 | Moran, III et al. |
| 5,272,700 A | 12/1993 | Hansen et al. |
| 5,311,550 A | 5/1994 | Fouche et al. |
| 5,377,035 A | 12/1994 | Wang et al. |
| 5,408,349 A | 4/1995 | Tsushima et al. |
| 5,471,645 A | 11/1995 | Felix |
| 5,481,542 A | 1/1996 | Logston et al. |
| 5,481,561 A | 1/1996 | Fang |
| 5,487,099 A | 1/1996 | Maekawa |
| 5,510,859 A | 4/1996 | Douglass et al. |
| 5,557,612 A | 9/1996 | Bingham |
| 5,590,409 A | 12/1996 | Sawahashi et al. |
| 5,596,604 A | 1/1997 | Cioffi et al. |

(Continued)

FOREIGN PATENT DOCUMENTS

CA 2187141 4/1998

(Continued)

OTHER PUBLICATIONS

Golestani, S. (1995) "Network Delay Analysis of a Class of Fair Queueing Algorithms", *IEEE Journal on Selected Areas in Communication* 13(6):1057-1070.

(Continued)

*Primary Examiner*—Brenda Pham
(74) *Attorney, Agent, or Firm*—John W. Carpenter; Reed Smith, LLP (57) ABSTRACT

A system and method for adaptive modulation of downstream communication between a wireless hub and a wireless modem on a selected downstream channel is provided. The adaptive modulation allows for changing the downstream modulation on a packet by packet basis. The downstream modulation is changed by specifying modulation parameters including any of a modulation format, symbol rate, and FEC for each packet. A super frame may be utilized that includes a header that specifies different modulation parameters for each of multiple data packets associated with the super frame. The modulated transmissions are sent on fixed bandwidth channels that are specified based on the bit rate of the modulated transmission.

28 Claims, 4 Drawing Sheets

240 - Header

U.S. PATENT DOCUMENTS

| | | | |
|---|---|---|---|
| 5,606,664 A | 2/1997 | Brown et al. | |
| 5,625,874 A | 4/1997 | Uchida et al. | |
| 5,634,206 A | 5/1997 | Reed et al. | |
| 5,666,646 A | 9/1997 | McCollum et al. | |
| 5,724,385 A | 3/1998 | Levin et al. | |
| 5,734,589 A | 3/1998 | Kostreski et al. | |
| 5,740,525 A | 4/1998 | Spears | |
| 5,752,161 A | 5/1998 | Jantti et al. | |
| 5,796,783 A | 8/1998 | Crawford | |
| 5,809,090 A | 9/1998 | Buternowsky et al. | |
| 5,809,406 A | 9/1998 | Taki et al. | |
| 5,809,427 A | 9/1998 | Perreault et al. | |
| 5,818,825 A | 10/1998 | Corrigan et al. | |
| 5,831,690 A | 11/1998 | Lyons et al. | |
| 5,862,451 A | 1/1999 | Grau et al. | |
| 5,867,528 A | 2/1999 | Verbueken | |
| 5,896,414 A | 4/1999 | Meyer et al. | |
| 5,903,558 A | 5/1999 | Jones et al. | |
| 5,909,384 A | 6/1999 | Tal et al. | |
| 5,937,005 A | 8/1999 | Obuchi et al. | |
| 5,940,743 A | 8/1999 | Sunay et al. | |
| 5,963,843 A | 10/1999 | Sit et al. | |
| 5,963,870 A | 10/1999 | Chheda et al. | |
| 5,974,106 A | 10/1999 | Dupont | |
| 5,978,855 A | 11/1999 | Metz et al. | |
| 5,991,286 A | 11/1999 | Labonte et al. | |
| 6,009,310 A | 12/1999 | Motohashi | |
| 6,035,008 A | 3/2000 | Kim | |
| 6,035,209 A * | 3/2000 | Tiedemann et al. | 455/522 |
| 6,052,408 A | 4/2000 | Trompower et al. | |
| 6,072,839 A | 6/2000 | Mondal et al. | |
| 6,075,787 A | 6/2000 | Bobeck et al. | |
| 6,111,887 A | 8/2000 | Daily et al. | |
| 6,112,232 A | 8/2000 | Shahar et al. | |
| 6,128,588 A | 10/2000 | Chacon | |
| 6,140,911 A | 10/2000 | Fisher et al. | |
| 6,141,356 A | 10/2000 | Gorman | |
| 6,157,311 A | 12/2000 | Berkovich | |
| 6,160,447 A | 12/2000 | Huang | |
| 6,172,970 B1 | 1/2001 | Ling et al. | |
| 6,185,227 B1 | 2/2001 | Sipola | |
| 6,195,697 B1 | 2/2001 | Bowman-Amuah | |
| 6,212,240 B1 * | 4/2001 | Scheibel et al. | 375/261 |
| 6,407,993 B1 * | 6/2002 | Moulsley | 370/347 |

FOREIGN PATENT DOCUMENTS

| | | |
|---|---|---|
| EP | 0021 544 A1 | 1/1981 |
| EP | 0025 767 A1 | 3/1981 |

OTHER PUBLICATIONS

Stiliadis, D. et al. (1998) "Rate-Proportional Servers: A Design Methodology for Fair Queueing Algorithms", *IEEE/ACM Transactions of Networking* 6(2):164-174.

Stiliadis, D. et al. (1998) "Efficient Fair Queuing Algorithms for Packet-Switched Networks", *IEEE/ACM Transactions of Networking* 6(2):175-185.

Data Over Cable Interface Specifications, Cable Modem Termination System-Network Side Interface Specification, SP-CMTS-NSII01-960702 (Jul. 2, 1996) pp. i-13.

Data-Over-Cable Service Interface Specifications, Cable Modem to Customer Premise Equipment Interface Specification. SP-CMC1-102-980317 (Mar. 17, 1998) pp. i-40.

Data-Over-Cable Service Interface Specifications, Radio Frequency Interface Specification, SP-RFI-I04-980724 (Jul. 24, 1998) pp. i-196.

Data-Over-Cable Service Interface Specifications, Operations Support System Interface Specification SP-OSSI-102-990113 (Jan. 13, 1999) pp. i-14.

Data-Over-Cable Service Interface Specifications, Operations Support System Interface Specification Radio Frequency Interface, SP-OSSI-RFI-103-990113 (Jan. 13, 1999) pp. i-29.

Data-Over-Cable Service Interface Specifications, Baseline Privacy Interface Specification, SP-BPI-102-990319 (Mar. 19, 1999) pp. i-88.

Data-Over-Cable Service Interface Specifications, Baseline Privacy Interface Specification, SP-BPI-102-990731 (Jul. 31, 1999) pp. i-160.

Data-Over-Cable Service Interface Specifications, Radio Frequency Interface Specification, SP-RFIv1.1-I03-991105 (Nov. 5, 1999) pp. i-366.

Data-Over-Cable Service Interface Specifications, Operations Support System Interface Specification SP-OSSIv1.1-DO1-991115 (Nov. 15, 1999) pp. i-81.

Data-Over-Cable Service Interface Specifications, Operations Support System Interface Specification SP-OSSIv1.1-103-001220 (Dec. 20, 2000) p. ii.

* cited by examiner

Legend

220 Data Packet
230 Training Packet
240 Header
250 Data Field
260 Fixed Data Field

FIG. 4

ADAPTIVE DOWNSTREAM MODULATION SCHEME FOR BROADBAND WIRELESS ACCESS SYSTEMS

This application claim benefit of Provisional Application No. 60/187,567, filed on Mar. 7, 2000.

BACKGROUND OF THE INVENTION

1. Field of Invention

The present invention relates to broadband wireless access systems, and amongst other things to an adaptive downstream modulation scheme for use in broadband wireless access systems.

2. Discussion of Background

Point to multipoint fixed broadband wireless access systems over MMDS networks are known in broadcast situations. These networks operate over licensed bands including the MMDS band (2,150 to 2,162 MHz), the WCS band (2,305 to 2,311 MHz) and the ITFS/MMDS bands (2,500 to 2,686 MHz).

Figure 1:
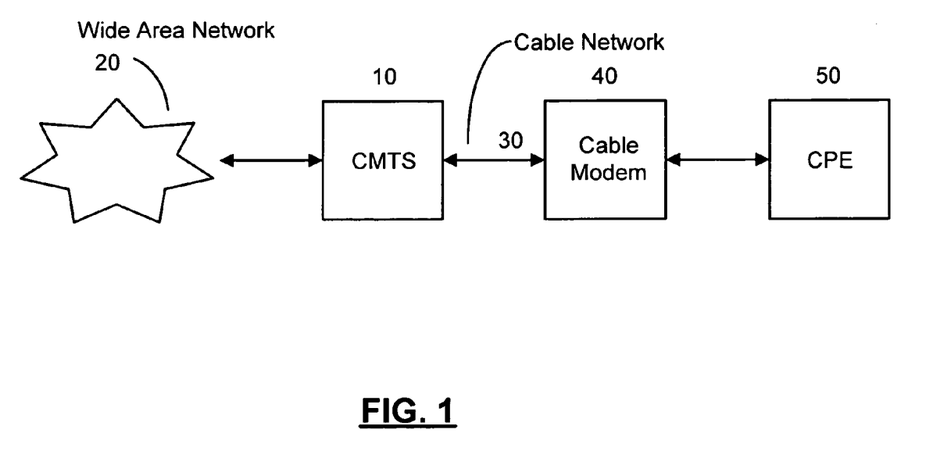
FIG. 1 is an overview of a known data over cable system.

A known wireless broadband access system, which operates at a range of between 50 MHz and 864 MHz, but not in the MMDS, WCS, or ITFS/MMDS bands, is the data over cable specification system, which is specified in the data over cable system interface specifications (DOCSIS). An overview of a wireless DOCSIS system is depicted in FIG. 1. A CMTS 10 communicates with a wide area network 20, such as the Internet. The CMTS 10 can transmit signals from the wide area network 20 along a cable network 30 through cable modems 40 to CPE 50. CPE 50 messages can be transmitted to the wide area network 20 through the cable modem 40 along the cable network 30 to the CMTS 10.

In point to multipoint broadband wireless access systems one central end-point, e.g. the head-end, communicates through a bi-directional link or links with multiple end-points, e.g. the nodes. The number of nodes in communication varies in time and can be none, one or two or more at any specific time.

The link(s) between the head-end and the nodes are combined in one or more channels. The signal path from the central end-point to the nodes is referred to as downstream, while the signal path from the nodes to the central end-point is referred to as upstream.

In such a system the diverse topological conditions of each user within the service area in terms of factors such as signal to noise, multipath, and fading make it difficult to implement a flexible communication scheme that will enable per user optimization with respect to robustness and throughput. Further, these conditions vary over time, which means that the characteristics of downstream channels change over time, which further adds to the difficulty of maintaining quality and flexible communication over wireless networks.

As the characteristics of the downstream channel change, wireless communication systems have to attempt to balance two competing factors to improve communication. The major concern for all data systems operators is the improvement and increase of the data throughput of the system. In single carrier systems, the data throughput is generally increased by using a higher order modulation, e.g. QAM 64 has a higher data capacity than QAM 16. However, if there are problems in the transmission path or with a wireless receiver, the operator of the system should attempt to increase the robustness of the communication path in order to prevent packet loss and decrease error rates. Robustness is increased by reducing the data communication rate, which is generally performed by decreasing the modulation type, e.g. moving from QAM 16 to QPSK. As can be seen from the above discussion, increasing the modulation type results in a lower robustness and a decrease in the modulation type causes a decrease in data throughput making the selection of the modulation type a very important factor in the implementation of wireless communication systems.

Therefore, there exists a need for an effective way to both maximizes the data throughput and the robustness of wireless communication systems.

SUMMARY OF THE INVENTION

The present invention provides an adaptive downstream communication and modulation scheme that allows switching the type of modulation utilized on a packet by packet basis of transmissions from a wireless hub to any wireless modem in communication with the wireless hub.

In one embodiment, the present invention provides for a method for dynamic downstream communication, comprising transmitting a first packet from a wireless base station to a wireless modem utilizing a first downstream modulation type, receiving the first packet at the wireless modem, and demodulating the first packet at the wireless modem. The method also comprises transmitting a second packet from the wireless base station to the wireless modem utilizing a second downstream modulation type that is different than the first downstream modulation type, receiving and demodulating the second packet at the wireless modem.

In another embodiment, the present invention provides for a carrier signal modulated with an information signal for communicating between two wireless devices, the information signal comprising a header portion and a data portion, the header portion comprising a modulation identity portion comprising information identifying a modulation type of a plurality of modulation types utilized to modulate the data portion of the information signal.

The present invention is embodied as a method for dynamic downstream communication in a broadband wireless access system, comprising the steps of transmitting a first packet from a wireless hub to a wireless modem utilizing a first downstream modulation type of a plurality of downstream modulation types, receiving the first packet at the wireless modem, demodulating the first packet at the wireless modem according to the first downstream modulation type, transmitting a second packet from the wireless hub to the wireless modem utilizing a second downstream modulation type of the plurality downstream modulation types that is different than the first downstream modulation type, receiving the second packet at the wireless modem, and demodulating the second packet at the wireless modem according to the second downstream modulation type.

The present invention includes a carrier signal modulated with an information signal for communicating between two wireless devices, the information signal comprising a header portion and a data portion, the header portion comprising a modulation identity portion comprising information identifying a modulation type of a plurality of modulation types utilized to modulate the data portion of the information signal.

Both the method, production of the carrier signal may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
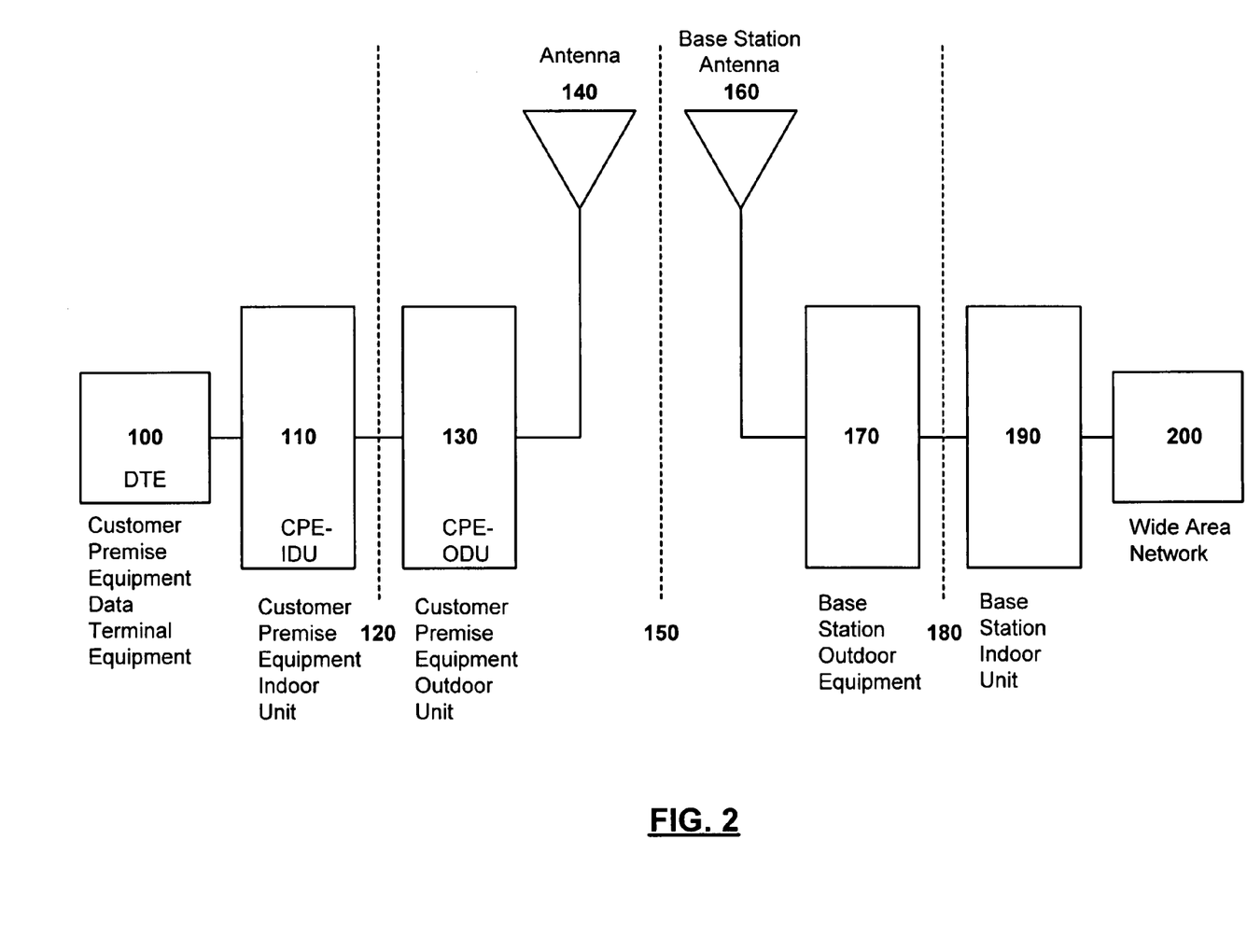
FIG. 2 is a block diagram of a broadband wireless access system according to a presently preferred embodiment of the present invention.

Referring again to the drawings, wherein like reference numerals designate identical or corresponding parts, and more particularly to FIG. 2 thereof, there is illustrated a Customer Premise Equipment (CPE) Data Terminal Equipment (DTE) 100 which is a customer computing device such as personal, computer, computer work station, hand held, or the like that is used on the customer premises for data processing or other purposes. The CPE DTE 100 is in communication with a customer premises indoor unit (CPE-IDU) 110. The CPE-IDU 110 is coupled to the customer premises outdoor unit (CPE-ODU) 130 through a IDU-ODU interface 120, which is presently preferred to operate at IF. However, other arrangements of components, including a combined CPE-ODU and CPE-IDU may be utilized.

In the presently preferred embodiment, the CPE-ODU 130 performs the upconversion from and downconversion to the IF range from the RF range. Again, as with each arrangement of electronic components presented herein, other combinations of the parts or functions described herein may be utilized (e.g., the CPU-IDU may perform one or more of the frequency conversions).

The antenna 140 is utilized by the CPE-ODU 130 for transmission and reception of signals to communicate with a base station by sending signals to base station antenna 160 using an over the air interface 150. The base station antenna 160 is coupled to the base station outdoor equipment (BS-ODU) 170. The BS-ODU 170 communicates with base station indoor equipment (BS-IDU) 190, which in turn communicates to a wide area network (WAN 200) such as the Internet.

The WAN 200 may be connected to the BS-IDU over a telephony interface, via a switch. Alternatively, a data communication interface, using a router or bridge for example, couples the BS-IDU to the wide area network, through a data communication interface. Other configurations of switches, networks, telephony, and other communication interfaces may be utilized. In the presently preferred embodiment, the BS-ODU 170 performs all needed upconversions and downconversions between the IF and RF frequency ranges.

In the presently preferred embodiment, a carrier frequency and modulation scheme is selected for downstream communication over one downstream channel available at the base station. For the upstream direction, it is presently preferred that an upstream carrier frequency for upstream communication is selected. The modulation scheme selected for the downstream is one of a number of modulation schemes available on the downstream communication channel selected. The base station indoor unit 190 will then transmit an information packet from base station antenna 160 to CPE antenna 140 utilizing the selected downstream modulation scheme. To transmit any subsequent packet, the base station can transmit utilizing any other modulation scheme of the number of modulation schemes available on the particular downstream channel based upon the signal quality on that downstream channel. It is also possible that the base station will change the downstream channel utilized.

The air interface 150 protocol is compliant with DOCSIS RFI Specification SP-RFI v1.1-I03-991105, which is incorporated herein by reference in its entirety as if fully set forth herein, with wireless extensions and modifications which are discussed in this patent application. According to the presently preferred embodiment, the communication protocols of the air interface 150 are compatible with the requirements specified in chapter 3 of the DOCSIS RFI specification except for the following: (1) the Transmission Convergence (TC) sub-layer is eliminated for downstream transmission; (2) the Physical Media Dependent (PMD) sub-layer and the Media Access Control (MAC) sub-layer are modified as described below; (3) the Physical Media Dependent sub-layer of the air interface relative to chapter 4 of the DOCSIS RFI specification are described below; (4) Media Access Control layer of the air interface 150 is compatible with chapter 6 and chapter 7 of the DOCSIS RFI specification except for the modifications that are described below; (6) Quality of Service (QoS) maintenance is compatible with chapter 8, except that the best effort service is expanded to maximize the subscribers served (over booking), while ensuring QoS at the objective data rates; (7) Link Layer Encryption is compatible with DOCSIS BPI Specification SP-BPI-I02-990319 and DOCSIS BPI+ Specification SP-BPI+-I03-991105; and the (8) The Operations Support System Interface (OSSI) is based on DOCSIS 1.1 OSSI Specification SP-OSSI v1.1-D02-000131, which is incorporated herein in its entirety as if fully set forth herein, this include the MIB made available in the DOCSIS specification and the private MIB for wireless enhancements.

The wireless modifications and extensions to the DOCSIS specifications provide an additional level of robustness, which is a preferred implementation of the method and system of the present invention in a typical MMDS environment.

The first wireless modification and extension to the DOCSIS specification is that the DOCSIS single carrier scheme is maintained with additional, more robust, QAM constellations (or modulation formats) (i.e., QPSK and 16 QAM) plus lower symbol rates (i.e., 3 MHz and 1.5 MHz) on the downstream. The DOCSIS upstream QAM constellations and symbol rates are maintained.

The second wireless modification and extension to the DOCSIS specification is the implementation of a packet by packet adaptive modulation scheme for downstream communication. With this scheme, each packet is modulated with a selected QAM constellation for the destination user. This scheme significantly reduces the required number of downstream channels, due to the ability to improve signal quality within each channel, while at the same time maintaining the optimal constellation for each user, i.e., highest constellation subject to robustness criteria. Further, the adaptive modulation scheme includes the ability for packet by packet synchronization and error correction. Therefore, the DOCSIS downstream Transmission Convergence (TC) sublayer (i.e., MPEG transport) is eliminated.

However, even when the adaptive modulation scheme is used, transition from one channel to another channel may still be required due to frequency selective fading or the inability to use available, more robust, lower symbol rate modulation types within an individual channel. Furthermore, transition of the modem from one downstream channel to an alternative downstream channel is preferred to be performed in conjunction with the adaptive downstream modulation scheme because of the dynamic wireless environment.

Considering the large number of possible downstream PHY schemes, automatic channel acquisition is maintained by periodically transmitting a Downstream Channel Descriptor (DCD) message over the downstream channels. These messages enable the wireless modem to acquire the information regarding all the applicable downstream channels (i.e., channels serving the user sector).

Table 1 provides an example DCD message. The Base Station generates DCD messages in the format shown in Table 1, including, for example, all of the following parameters:

TABLE 1

Downstream Channel Descriptor (DCD)

| Bit | 0 | 8 | 16 | 24 | 31 |
|---|---|---|---|---|---|
| Mac Management Message Header | | | | | |
| Cell ID | Sector ID | Configuration Change Count | | Number of channels | |
| TLV-encoded information for the overall channel | | | | | |
| TLV-encoded downstream profile description | | | | | |
| TLV-encoded information for | | | | | |
| The subsequent downstream profile descriptors | | | | | |

There may be more than one channel descriptor in one DCD message. Each channel description (see table 4) defines one channel. There is no difference between the formats of preceding and subsequent channel descriptions. Table 2 provides descriptions of the various fields for the DCD message of Table 1.

TABLE 2

Downstream Channel Descriptor Descriptions

| MAC Management Message Header | As defined in DOCSIS. |
|---|---|
| Configuration Change Count (8 bits) | Incremented by one (modulo the field size) by the BS, whenever any of the values of any of the downstream channels descriptors change. |
| Number of channels | Number of downstream channels that are available for this MAC domain. This number may include channels, which are defined in other DCD messages. |

All other parameters are coded as TLV tupples. Type values used are defined in Table 3 for channel parameters, and Table 4 for downstream profiles attributes. Channel-wide parameters precede downstream profile descriptors.

Channel descriptors are compound TLV encodings that define the parameters for each downstream channel. Within each channel descriptor is an unordered list of attributes encoded as TLV values:

TABLE 3

Channel TLV Parameters

| Name | Type (1 byte) | Length (1 byte) | Value (Variable length) |
|---|---|---|---|
| Downstream channel ID | 1 | 1 | The Identifier of the downstream channel to which this message refers. |
| RF Frequency | 2 | 4 | RF frequency in KHz |
| IF Frequency | 3 | 4 | IF frequency in KHz |
| Modulation type | 4 | 1 | 1 = QPSK 2 = 16QAM 3 = QAM64 4 = QAM256 5 = Adaptive modulation |
| Symbol rate | 5 | 4 | Symbol rate (bps) |
| Bandwidth | 6 | 4 | Bandwidth (Hz) |
| Roll off Factor | 7 | 1 | 200 * Roll off factor |
| Downstream profile Descriptor | 8 | Variable | May appear more than once. Described blow. The length is the number of bytes in the overall object, including embedded TLV items. |

Downstream profile descriptors are compound TLV encoding that define the parameters for each downstream profile. Within each downstream profile descriptor is an unordered list of attributes encoded as TLV values:

TABLE 4

Downstream Profile TLV Parameters

| Name | Type (1 byte) | Length (1 byte) | Value (Variable length) |
|---|---|---|---|
| Downstream profile ID | 1 | 1 | The Identifier of the downstream profile to which this attributes set refers. |
| Modulation type | 2 | 1 | 1 = QPSK; 2 = 16QAM; 3 = QAM64 |
| FEC scheme | TBD | TBD | TBD, based on Phy definitions |

Tables 5 and 6 provide another DCD message example and example profile attributes:

| MAC Management Message Header | As defined in DOOSIS. |
|---|---|
| Cell ID | Identifier of the Cell where this message is transmitted (1–255) . If cell information is not being used, a single value should be indicated in all DCD messages. |
| Sector ID | Identifier of the geographic sector, which can use these downstream channels (1–255). If sector information is not used, a single value should be indicated in all DCD messages. |
| Configuration Change Count (8 bits) | Incremented by one (modulo the field size) by the BS, whenever any of the values of any of the downstream channels descriptors change. |

TABLE 5-continued

| | Downstream Channel Descriptor | | | |
|---|---|---|---|---|
| Bit | 0 | 8 | 16 | 24 | 31 |

Number of channels — Number of downstream channels that are available for this MAC domain. This number may include channels, which are defined in other DCD messages.

TABLE 5

| | Downstream Channel Descriptor | | | |
|---|---|---|---|---|
| Bit | 0 | 8 | 16 | 24 | 31 |

Mac Management Message Header
Cell ID    Sector ID    Configuration Change Count    Number of channels
TLV-encoded information for the overall channel
TLV-encoded downstream profile description

TABLE 5-continued

| | Downstream Channel Descriptor | | | |
|---|---|---|---|---|
| Bit | 0 | 8 | 16 | 24 | 31 |

TLV-encoded information for
The subsequent downstream profile descriptors

All other parameters are coded as TLV tupples. The type values used are defined in table 5, for channel parameters, and table 6, for downstream profiles attributes. Channel-wide parameters precede downstream profile descriptors.

Channel descriptors are compound TLV encodings that define the parameters, for each downstream channel. Within each channel descriptor is an unordered list of attributes, encoded as TLV values:

TABLE 6

Channel TLV Parameters

| Name | Type (1 byte) | Length (1 byte) | Value (Variable length) |
|---|---|---|---|
| Downstream Channel ID | 1 | 1 | The Identifier of the downstream channel to which this message refers. |
| RF Frequency | 2 | 4 | RF frequency in KHz |
| IF Frequency | 3 | 4 | IF frequency in KHz |
| Modulation type | 4 | 1 | 1 = QPSK 2 = 16QAM 3 = QAM64 4 = QAM256 5 = Adaptive modulation |
| Symbol rate | 5 | 4 | Symbol rate (bps) |
| Bandwidth | 6 | 4 | Bandwidth (Hz) |
| Roll off Factor | 7 | 1 | 200 * Roll off factor |
| Downstream Errors Threshold | 8 | 4 | Threshold of detected errors. If the number of detected errors is more than this number, a downstream channel switching MUST be initiated. The counting of errors is initialized after each measurement period as defined in the FER measurement period TLV parameter. |
| FEC scheme | 9 | 1 | 1 = ITU-T J.83 Annex A/C 2 = ITU-T J.83 Annex B 3 = Adaptive |
| Priority for a new modem | 10 | 1 | Priority to be used by a new modem - Lowest number is higher priority. |
| Priority for changing channel | 11 | 1 | Priority to be used if the current channel has poor conditions - Lowest number is higher priority. |
| Cell ID | 12 | 1 | The Identifier of the Cell which transmit the described downstream channel |
| FER measurement period | 13 | 1 | Time period for downstream error Rate measurement (See Downstream Errors Threshold TLV parameter). Time is given in seconds, in the range of 1–255 Sec. |
| Downstream profile Descriptor | 14 | Variable | May appear more than once. Described below. The length is the number of bytes in the overall object, including embedded TLV items. |

The priority should be determined by the hub. The priority MAY be dynamically changed by the hub between DCD messages. Such changes MAY be used to balance the load between the channels. A different priority can be assigned for a new initializing modem or to a registered modem, which has to switch channel due to poor RF conditions. The later priority MAY depend on the current channel, in such a way that different priorities will be assigned in DCD messages that are delivered on different channels.

The method to assign the priorities to each channel is vendor dependent.

Downstream profile descriptors are compound TLV encoding that define the parameters, for each downstream profile. Within each downstream profile descriptor is an unordered list of attributes, encoded as TLV values:

FEC for QAM based options for North American market (Table 7a) and the European and rest of the world market (Table 7B) will be as described below:

TABLE 7A

| Modulation Format(s) | Symbol Rate | Channel BW | Spectral Shaping | Reference(s) |
|---|---|---|---|---|
| 64-QAM | 5.056941 Msps ± 5 ppm | 6 MHz | .18 | ITU-T J.83 Annex B |
| 64-QAM 16-QAM | 5.304 Msps ± 5 ppm | 6 MHz | .13 | ITU-T J.83 Annex A |
| QPSK | 5.304 Msps ± 5 ppm | 6 MHz | .13 | ITU-T J.83 Annex A - MSB of 16-QAM constellation |
| 64-QAM 16-QAM, | 2.652 Msps ± 5 ppm | 3 MHz | .13 | ITU-T J.83 Annex A/C FEC |
| QPSK | 2.652 Msps ± 5 ppm | 3 MHz | .13 | ITU-T J.83 Annex A-MSB of 16-QAM constellation |
| 64-QAM 16-QAM, | 1.326 Msps ± 5 ppm | 1.5 MHz | .13 | ITU-T J.83 Annex A/C FEC |
| QPSK | 1.326 Msps ± 5 ppm | 1.5 MHz | .13 | ITU-T J.83 Annex A - MSB of 16-QAM constellation |

TABLE 6

Downstream profile TLV Parameters

| Name | Type (1 byte) | Length (1 byte) | Value (Variable length) |
|---|---|---|---|
| Downstream profile ID | 1 | 1 | The Identifier of the downstream profile to which this attributes set refers. |
| Modulation type | 2 | 1 | 1 = QPSK; 2 = QAM16; 3 = QAM64 |
| FEC scheme | TBD | TBD | TBD, based on Phy definitions. Example for Reed Solomon: 1 byte indicating codeword length and 1 byte indicating the number of parity bytes. |

The adaptive modulation scheme according to a presently preferred embodiment of the present invention performs packet by packet selection of the modulation type (i.e., QAM constellation) for downstream communication. It is also presently preferred that the modulation schemes utilized have a fixed bandwidth.

The presently preferred modulation schemes and symbol rates, which are described for illustrative purposes only and not intended to be limiting in any way, for different downstream channels are provided in Tables 7A and 7B below. In addition, symbol rates, channel spacing, roll off factor and

TABLE 7B

| 64-QAM 16-QAM | 1.547 Msps ± 5 ppm | 1.75 MHz | .13 | ITU-T J.83 Annex A/C FEC |
|---|---|---|---|---|
| QPSK | 1.547 Msps ± 5 ppm | 1.75 MHz | .13 | ITU-T J.83 Annex A - MSB of 16-QAM constellation |
| 64-QAM 16-QAM | 3.094 Msps ± 5 ppm | 3.5 MHz | .13 | ITU-T J.83 Annex A/C FEC |
| QPSK | 3.094 Msps ± 5 ppm | 3.5 MHz | .13 | ITU-T J.83 Annex A - MSB of 16-QAM constellation |

During initialization of the wireless modem with the wireless base station, each wireless modem is assigned a downstream channel for communication with the wireless base station. Each downstream channel includes a number of different modulation types, which allow an increase in the information rate transmitted by using a higher modulation rate on the downstream channel or increase robustness by using a lower modulation rate. In order to maintain carrier, symbol and packet synchronization while utilizing multiple downstream modulation formats, additional information beyond the information utilized for basic downstream communication is presently preferred to be transmitted during downstream communication. The additional information is presently preferred to include:

1. An in-phase pilot, which is added to the QAM data signal. The in-phase pilot is a low power carrier that is transmitted along with the modulated signal. The in-phase pilot allows the wireless modem to determine and lock onto the carrier so that it can properly determine and demodulate the appropriate constellation. The transmission of the pilot carrier enables fast carrier synchronization and maintenance. The pilot enables the receiver to maintain a lock on the carrier of the modulated signal even if the receiver cannot decode the modulated signal (e.g., a receiver having only QPSK or QAM 16 decoding capabilities, but receiving a QAM 64 signal). Further, by providing fast carrier synchronization the system can quickly respond to multi-path and interference, increasing robustness the transmission of the pilot carrier increases the robustness with respect to multi-path and interference.

Carrier tracking will be done by all CPEs that can successfully lock and receive data using at least the QPSK modulation signal. Preferably, carrier tracking is done continuously by all CPEs, using symbol data that is delivered to all the CPEs. A CPE that is not receiving data will keep a continuous lock on the carrier.

An in-phase pilot is added to the signal to support carrier tracking even before timing and channel lock is achieved. The pilot is added to provide robust channel tracking in all marginal reception conditions even when timing tracking becomes marginal. The pilot signal is added to the transmitted signal by adding a DC value to the I (in phase) component of each symbol. In one embodiment, the DC value is added at a level of −8 dB of the RMS of the constellation of the data signal. This level of pilot amplitude adds 0.3 dB to the total energy of transmission.

Carrier tracking can be done using the pilot for channel acquisition and tracking while a data aided tracking method can be used for channel demodulation. The pilot eliminates the 90 degrees rotation invariance of the quadrature demodulation, mostly needed for the QPSK modulation, thus saving 3 dB SNR noise margin.

The carrier tracking mechanism at the receiver is done by a PLL (phase locked loop) which includes two types of phase detectors. One detector is based on the decoded data. This detector is used when the reception conditions enable decoding of the received data. This detector is the standard detector used in QAM receivers. The second detector is used when the reception conditions don't enable the decoding of the data in the current modulation scheme (e.g. when a 64QAM or 16QAM is received by a modem that can decode only QPSK). This detector enables locking on the inserted pilot. This is done by filtering the Q (quadrature phase) component with a Low Pass filter, a process which removes the data information. The phase error is related to the resulting signal that is the Q component of the pilot signal.

2. A QPSK modulated training packet is utilized to enable fast initial symbol rate and packet synchronization. The training packet is presently preferred to include a standard preamble and fixed data signal. The wireless modem can demodulate the fixed data signal and compare the fixed data signal against reference data.

3. Each data packet has a header. The header, or preamble, of each packet is a QPSK modulated header that is a part of each MAC frame. The header, or preamble, allows for maintenance of symbol and packet synchronization for all modems. Further, the header, or preamble, also is presently preferred to provide information regarding the modulation scheme of the data portion of the packet, the FEC that is used in the remainder of the packet, and the packet length. By determining, from the preamble, the demodulation type of the data portion of the packet, modems that are unable to demodulate the remainder of the packet will skip it and then demodulate the preamble, or header, of the next packet according to the packet length information in the header.

In some instances when a wireless modem is operating under poor receiving conditions, it may be able to demodulate a QPSK signal but not a 16QAM or 64QAM signal. However, the QPSK header can be demodulated by all wireless modems even if the remainder of the packet employs a 64QAM constellation. If the wireless modem cannot demodulate the signal, it can provide a message with this information to the wireless base station, which will transmit the next data packet to that wireless modem using a more robust modulation format that can be demodulated by the wireless modem. In this way, the system adjusts itself based on environmental conditions to allow the recipient modem to demodulate the packets intended for the particular modem, thereby reducing information loss and improving channel quality.

It is presently preferred that downstream communication involves additional steps that are utilized to determine whether to switch modulation types for the next downstream packet. First, during the initialization transaction the modem is synchronized to a channel that utilizes QPSK modulation. Then, during each downstream communication the wireless modem measures the carrier to noise ratio (CNR) of the received signal. The wireless modem then transmits a message with the CNR value to the base station.

Table 8 and Table 9 provide an example modified RNG-REQ message and parameters that support the transmission of a CNR value to the base station. TLV encoded information is added to the message as follows:

TABLE 8

| Bit | 0 | 8 | 16 | 24 | 31 |
|---|---|---|---|---|---|
| | Mac Management Message Header | | | | |
| | SID | | Downstream Channel ID | Pending Till Complete | |
| | TLV-encoded information | | | | |

The following TLV parameters are defined:

TABLE 9

| Name | Type (1 byte) | Length (1 byte) | Value (Variable length) |
|---|---|---|---|
| C/N | 1 | 1 | Carrier to Noise ratio in dB. |
| C/N measurement time | 2 | 2 | The time period in milliseconds that has been used for the C/N measurement. |
| Frame errors | 3 | 1 | Number of failed MPEG frames |
| Frame errors measurement time | 4 | 1 | The time period in seconds that has been used for the frame errors measurement. |

Finally, the Base Station modulates the next packet utilizing a modulation scheme selected according to CNR value received from the wireless modem. For instance, if the channel allows for QPSK, 16-QAM, and 64-QAM, then the CNR at the base station will have three ranges and the selection of QPSK, 16-QAM, and 64-QAM is based upon into which range the CNR falls. In one embodiment, if there are more than three or less than three modulation types available for the channel then the number of ranges will have the same amount of ranges as modulation types. In the case that the CNR of a particular modem enables only QPSK demodulation, the demodulator will maintain lock, and will not switch to 16-QAM and 64-QAM.

In another embodiment, the number of ranges is based on a number of FEC schemes, or a combination of FEC schemes and modulation types. In this embodiment, there can be many ranges implemented for various possible combinations. For example, with 3 FEC schemes (F1, F2, and F3), and 2 modulation types (QPSK and 16-QAM, for example), a total of 6 ranges might be implemented (1. F1/QPSK, 2. F1/16-QAM, 3. F2/QPSK . . . , etc.). In yet another embodiment, additional ranges are constructed using combinations of Modulation scheme, FEC scheme and symbol rate.

Figure 3:
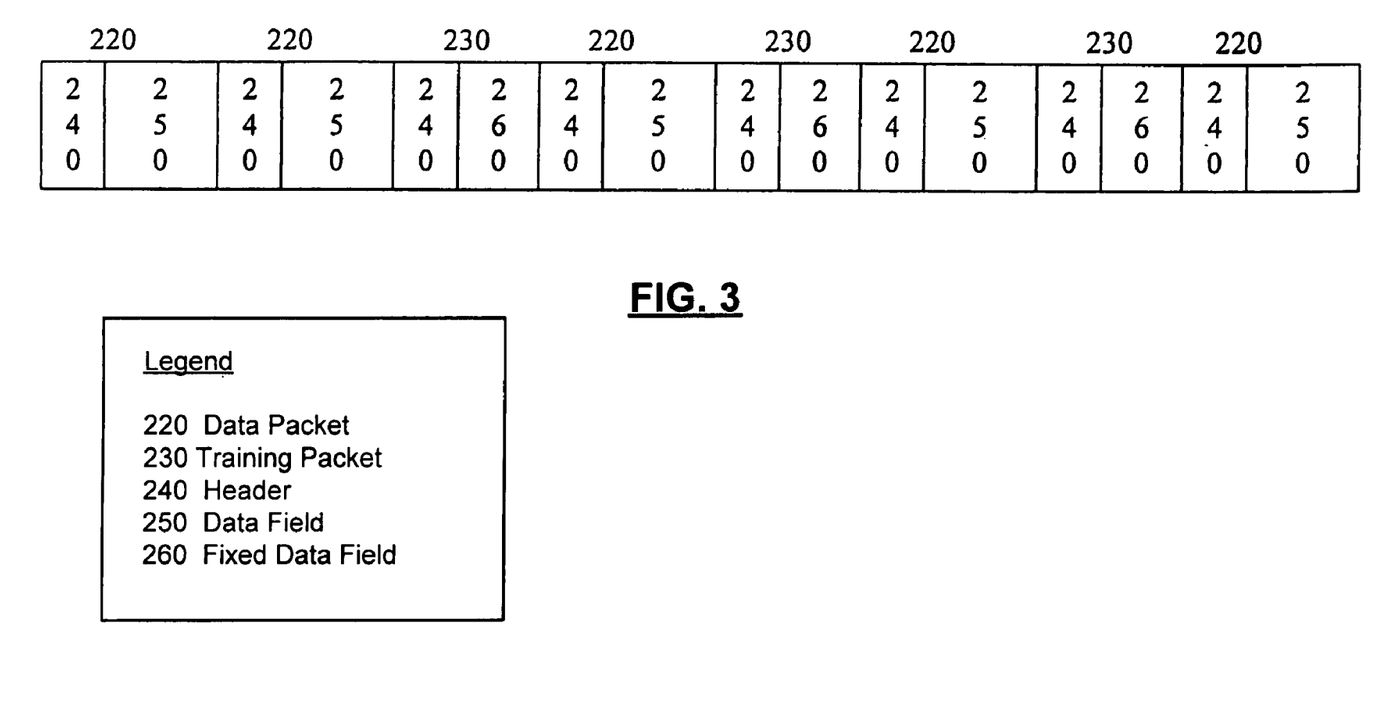
FIG. 3 is a diagram of a continuous downstream transmission according to a presently preferred embodiment of the present invention.

Referring to FIG. 3, a data stream is divided into data packets 220 and training packets 230. The data packets 220 contain a header 240, which is presently preferred to be QPSK modulated and to comprise 32 symbols, and a data field 250, which is presently preferred to be up to 4095 bytes. The data field 250 is modulated by either QPSK, 16QAM, or 64QAM depending on the modulation types available on that downstream channel, (e.g., see Table 1). It is also preferred that a programmable Reed Solomon FEC of length 16–255 bytes is used as part of the data field 250 (i.e., the data field is partitioned into multiple codewords), although any other data field format is capable of use with the present invention so long that it is compatible with a FEC scheme. The training packets 230 contain a header 240, which is presently preferred to be QPSK modulated, and a fixed data field 260, which is presently preferred to be QPSK modulated and of a length of up to 1023 symbols. The fixed data field 260 of the training packet 230 contains a fixed data signal that is known to the wireless modem and then is compared by the wireless modem to adjust the carrier center frequency it uses for demodulation and to adjust its equalizer level.

Figure 4:
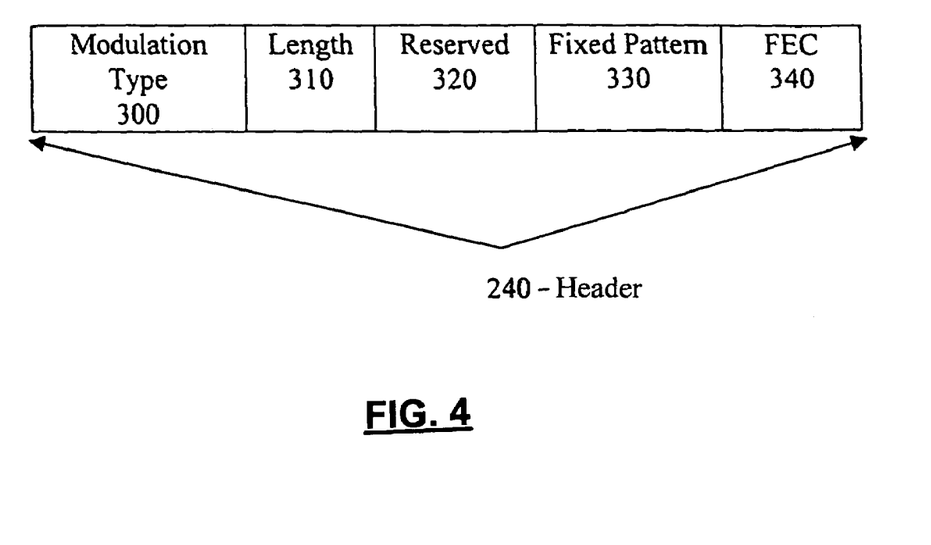
FIG. 4 is a diagram of a packet structure according to a presently preferred embodiment of the present invention.

Referring to FIG. 4, a header 240 comprises a modulation type field 300, which is presently preferred to be 3 bits long, and provides information describing the modulation type of the data field 250. A length field 310, which is presently preferred to be 12 bits long, and provides information as to the to the length of the data field 250 in bytes. A reserved field 320, which is presently preferred to be 9 bits long, provides the ability to add additional information for other signaling uses. A fixed pattern field 330 provides timing and synchronization information for the wireless modem and enables training for the equalizer. FEC field 340 provides the forward error correction. The training packet is received at the receiver, the receiver measures the parameters (CNR, error rates, for example), and makes corrections as needed (changes modulation or FEC, for example).

The presently preferred modulation type field 300 utilizes the following coding format: (i) 000 for default QPSK; (ii) 001 for QAM 16; (iii) 010 for QAM 64; and (iv) 011 for QAM 256. The remaining combinations are reserved for additional types of modulation that are supported by the system.

The present invention includes changing all parameters involved in the modulation and transmission of a communication between a transmitter and receiver, including, but not limited to a modulation format, symbol rate, and FEC or other parity information. The changes may be applied to multiple data packets as specified in a super frame, having a header that indicates the modulation and transmission parameters for the multiple data packets of the super frame, or standard frames having a header and corresponding data packet.

Table 6 provides an example format of a super frame.

TABLE 6

| PHY parameters for 1st data field | Length of 1st data field | PHY parameters for 2nd data field | Length of 2nd data field | ... | PHY parameters for nth data field | Length of nth data field | 1st data field | 2nd data field | ... | nth data field |
|---|---|---|---|---|---|---|---|---|---|---|
| Header | | | | | | | | | | |

Each data packet is modulated according to parameters specified in the header. The header may be constructed using indexes for each of the data packets, each index corresponding to a predefined set of parameters, including, at least one of a modulation format, symbol rate, and FEC scheme to be used on the data packets.

When indexes are utilized to identify the modulation scheme or other transmission parameters of a super frame or non-super frame, a list of the indexes and corresponding parameters is transmitted to the receiver prior to transmitting the frame.

In the case of a super frame, each packet may have a completely different set of parameters for transmission, thereby allowing various combinations of throughput and robustness to be used for each packet. For standard frames, again each packet may have different combinations of parameters.

The modulation formats may be any modulation format, but is preferred to be one of QPSK, QAM 16, and QAM 64. Preferrably, the header is transmitted usign QPSK modulation, and the data portion(s) are transmitted using the highest bandwidth modulation format that provides a sufficiently robust communication. The transmission may be performed using Orthogonal Frequency Division Multiplexing (OFDM).

The transmission parameters may be varied, and some packets may be transmitted at higher bit rates (5 Mbits per second, for example) and some packets may be transmitted at lower bit rates (1 Mbit per second, for example). The bit rate varies directly with a chosen symbol rate for the transmission. Channel width is reserved such that some channels have sufficient width for higher bit rate transmissions, and some channels have less width but are still capable of carrying lower bandwidth transmissions.

In one embodiment, the channels used for transmission are changed based on the symbol rate of the packets to be transmitted. For example, data packets having a higher bit rate of are transmitted on a channel having a wider channel width, and data packets having a lower bit rate are transmitted on channels having a more narrow channel bandwidth. Any number of channels having varied channel widths may be reserved and utilized in this manner.

While the aspects of the present invention have been described in terms of a downstream channel, these same techniques may be applied to any communication system regardless of the direction of transmission.

While the embodiments, applications and advantages of the present invention have been depicted and described, there are many more embodiments, applications and advantages possible without deviating from the spirit of the inventive concepts described and depicted herein. The invention should only be restricted in accordance with the spirit of the claims appended hereto and is not restricted by the preferred embodiments, specification or drawings.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMS, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, modulating packet data based on header data information, changing modulation constellations and/or downstream channels, acquiring carrier frequency using an in-phase pilot, reading and comparing a training packet and adjusting a communication channels based on the comparison, performing packet by packet modulation of a data portion of the packet based on CNR of received packets, preparing super frame headers indicating different modulation schemes, symbol rates, and FEC for multiple data packets, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method of preparing a packet communication, comprising the steps of:
    determining a modulation scheme for each data field of a set of data fields;
    placing an indication of the determined modulation schemes in a super frame header;
    modulating each of the data fields according to the determined modulation schemes;
    transmitting the super frame header and each of the modulated data fields; and
    transmitting a list of indexes and corresponding modulation schemes prior to transmitting the super frame header and data packets
    wherein said indication is an index that identifies a set of at least one of a modulation format, symbol rate, and FEC scheme to be used on the data packets.

2. The method according to claim 1, wherein said modulation schemes are at least one of QPSK, QAM 16, and QAM 64.

3. The method according to claim 1, wherein said step of transmitting comprises transmitting said header and data packets using OFDM.

4. A method of dynamic modulation in a communication system, comprising:
    preparing a super frame header that indicates a modulation scheme of at least one data packet;
    modulating the data packets according to the modulation scheme; and
    transmitting the header and data packets;
    receiving a status message transmitted from a receiver; and
    selecting the modulation scheme based on the received status message;
    transmitting a list of indexes and corresponding modulation schemes prior to transmitting the super frame header and data packets
    Wherein
    said indication is an index that identifies a set of at least one of a modulation format, symbol rate, and FEC scheme to be used to the data packets; and
    said status message includes error count information describing a number of errors detected in transmissions received by the receiver.

5. The method according to claim 4, wherein the modulation scheme includes at least one of a modulation format, symbol rate, and FEC scheme to be used on the data packets.

6. The method according to claim 5, wherein said modulation scheme is one of QPSK, QAM 16, and QAM 64.

7. The method according to claim 4, wherein said step of transmitting comprises transmitting said header and data packets using OFDM.

8. The method according to claim 4, wherein said status message includes CNR information describing a Carrier to Noise Ratio of transmissions previously received by the receiver.

9. The method according to claim 4, wherein the method is embodied in a set of computer readable instructions stored by computer readable media.

10. The method according to claim 9, wherein said error count is a bit error rate detected in transmissions received by the receiver.

11. A method of receiving dynamically modulated data packets, comprising the steps of:
    receiving super frame header data containing a modulation scheme used to modulate at least one data packet;
    receiving the data packets;
    demodulating the data packets according to the modulation scheme contained in the header data;
    preparing a status message indicating a quality of transmissions received; and
    transmitting the status message;
    receiving a list of indexes and corresponding modulation schemes prior to receiving the super frame header and data packets
    wherein said indication is an index that identifies a set of at least one of a modulation format, symbol rate, and FEC scheme to be used to the data packet; and
    said status message includes error count information describing a number of errors detected in the transmissions received.

12. The method according to claim 11, wherein the modulation scheme includes at least one of a modulation format, symbol rate, and FEC scheme to be used on the data packets.

13. The method according to claim 12, wherein said modulation scheme is one of QPSK, QAM16, and QAM 64.

14. The method according to claim 11, wherein said steps of receiving header data and receiving the data packets comprises receiving said header and data packets using OFDM.

15. The method according to claim 11, wherein the method is embodied in a set of computer readable instructions stored by computer readable media.

16. A method for dynamic downstream communication in a broadband wireless access system, comprising:
- transmitting a first packet from a wireless hub to a wireless modem utilizing a first downstream modulation type of a plurality of downstream modulation types;
- receiving the first packet at the wireless modem;
- demodulating the first packet at the wireless modem according to the first downstream modulation type;
- transmitting a second packet from the wireless hub to the wireless modem utilizing a second downstream modulation type of the plurality downstream modulation types that is different than the first downstream modulation type;
- receiving the second packet at the wireless modem;
- demodulating the second packet at the wireless modem according to the second downstream modulation type;
- transmitting a third packet from the wireless hub to the wireless modem utilizing the first downstream modulation type of the plurality downstream modulation types, wherein the third packet is transmitted prior to transmission of the second packet;
- receiving the third packet at the wireless modem; and
- demodulating the third packet at the wireless modem according to the first downstream modulation type; and
- transmitting an in-phase pilot signal to the wireless modem for determining a carrier frequency for the wireless modem to communicate with the wireless hub.

17. The method of claim 16, wherein the second packet is a next data packet transmitted from the wireless hub to the wireless modem after the first packet.

18. The method of claim 16, further comprising the steps of
- identifying the first downstream modulation type by reading a portion of the first packet comprising an identity of the first downstream modulation type; and
- identifying the second downstream modulation type by reading a portion of the second packet comprising an identity of the second downstream modulation type.

19. The method according to claim 16, wherein said method is embodied in a set of computer readable instructions in an electronic signal.

20. A method for dynamic downstream communication in a broadband wireless access system, comprising:
- transmitting a first packet from a wireless hub to a wireless modem utilizing a first downstream modulation type of a plurality of downstream modulation types;
- receiving the first packet at the wireless modem;
- demodulating the first packet at the wireless modem according to the first downstream modulation type;
- transmitting a second packet from the wireless hub to the wireless modem utilizing a second downstream modulation type of the plurality downstream modulation types that is different than the first downstream modulation type;
- receiving the second packet at the wireless modem;
- demodulating the second packet at the wireless modem according to the second downstream modulation type;
- determining at the wireless modem a carrier to noise ratio of a carrier signal utilized to transmit the first packet;
- transmitting the carrier to noise ratio of the carrier signal utilized to transmit the first packet from the wireless modem to the wireless hub; and
- determining at the wireless hub the second modulation type based upon the carrier to noise ratio; and
- transmitting an in-phase pilot signal to the wireless modem for determining a carrier frequency for the wireless modem to communicate with the wireless hub.

21. The method according to claim 20, wherein the method is embodied in a set of computer readable instructions stored by computer readable media.

22. A method for dynamic downstream communication in a broadband wireless access system, comprising:
- transmitting a first packet from a wireless hub to a wireless modem utilizing a first downstream modulation type of a plurality of downstream modulation types;
- receiving the first packet at the wireless modem;
- demodulating the first packet at the wireless modem according to the first downstream modulation type;
- transmitting a second packet from the wireless hub to the wireless modem utilizing a second downstream modulation type of the plurality downstream modulation types that is different than the first downstream modulation type;
- receiving the second packet at the wireless modem;
- demodulating the second packet at the wireless modem according to the second downstream modulation type; and
- transmitting an in-phase pilot signal as part of a data portion of the first packet and transmitting an in phase pilot signal as part of a data portion of the second packet, wherein the carrier frequency is determined by the wireless modem-by utilizing the in-phase pilot signal.

23. A method for dynamic downstream communication in a broadband wireless access system, comprising:
- transmitting a first packet from a wireless hub to a wireless modem utilizing a first downstream modulation type of a plurality of downstream modulation types;
- receiving the first packet at the wireless modem;
- demodulating the first packet at the wireless modem according to the first downstream modulation type;
- transmitting a second packet from the wireless hub to the wireless modem utilizing a second downstream modulation type of the plurality downstream modulation types that is different than the first downstream modulation type;
- receiving the second packet at the wireless modem;
- demodulating the second packet at the wireless modem according to the second downstream modulation type; and
- transmitting a training packet from the wireless hub to the wireless modem; and
- transmitting an in-phase pilot signal to the wireless modem for determining a carrier frequency for the wireless modem to communicate with the wireless hub.

24. A carrier signal modulated with an information signal for communicating between two wireless devices, the information signal comprising a header portion and a data portion, the header portion comprising a modulation identity portion comprising information identifying a modulation type of a plurality of modulation types utilized to modulate the data portion of the information signal;
- wherein the header portion further comprises timing and synchronization for the particular information signal; and the data portion comprises a in-phase pilot signal that is capable of being utilized to determine a frequency of the carrier signal.

25. The carrier signal modulated with the information signal for communicating between two wireless devices of claim 24 wherein the data portion comprises a fixed data pattern and wherein the information signal is utilized as a training signal.

26. The carrier signal modulated with the information signal for communicating between two wireless devices of claim 24 wherein the header portion is modulated utilizing a first type of modulation and the data portion is modulated utilizing a second type of modulation different than the first type of modulation.

27. A carrier signal modulated with an information signal for communicating between two wireless devices, the information signal comprising a header portion and a data portion, the header portion comprising a modulation identity portion comprising information identifying a modulation type of a plurality of modulation types utilized to modulate the data portion of the information signal;

wherein the data portion comprises a in-phase pilot signal that is capable of being utilized to determine the frequency of the carrier signal.

28. A carrier signal modulated with an information signal for communicating between two wireless devices, the information signal comprising a header portion and a data portion, the header portion comprising a modulation identity portion comprising information identifying a modulation type of a plurality of modulation types utilized to modulate the data portion of the information signal;

wherein the data portion comprises an in-phase pilot identifying a frequency of the carrier signal and a fixed data pattern and wherein the information signal is utilized as a training signal.

* * * * *